UNITED STATES PATENT OFFICE.

ALBRECHT SCHMIDT AND GUSTAV KRÖNLEIN, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

INDOPHENOLSULFONIC ACIDS AND PROCESS OF MAKING SAME.

1,128,370.  Specification of Letters Patent.  Patented Feb. 16, 1915.

No Drawing.  Application filed April 24, 1913.  Serial No. 763,431.

*To all whom it may concern:*

Be it known that we, ALBRECHT SCHMIDT, Ph. D., chemist, and GUSTAV KRÖNLEIN, Ph. D., chemist, citizens of the Empire of Germany, residing at Höchst-on-the-Main, Germany, have invented certain new and useful Improvements in Indophenolsulfonic Acids and Processes of Making Same, of which the following is a specification.

As is known, the disulfonic acid of carbazol and its derivatives cannot be converted with p-nitrosophenol or p-aminophenol into indophenolsulfonic acids.

Now we have found that by combining the monosulfonic acids of carbazols with phenol derivatives yielding indophenols,—said derivatives comprising p-nitrosophenols or their derivatives or p-aminophenols or their derivatives,—there can very readily be obtained products which may be regarded as indophenolsulfonic acids and which, by the usual reducing processes, are converted into leuco compounds. The monosulfonic acids of carbazol and its derivatives, used for this purpose as parent material can be produced by sulfonation in an indifferent solvent, for instance nitrobenzene, with sulfuric acid or fuming sulfuric acid, as described in a copending application of Schmidt, Krönlein and Runne, Ser. No. 763,397, filed April 24, 1913. They form readily crystallizing salts. These indophenol sulfonic acids are blue bodies, very readily soluble in water, soluble in concentrated sulfuric acid with a blue color, in diluted alkalis and in alcohol with a reddish-violet color. They have the general formula:

wherein X stands for the homologous series; H, methyl, ethyl, etc.; R for a cation, and Ar for an arylene residue. These new products and their leuco compounds can be used as parent material for the manufacture of dyestuffs.

The following examples illustrate our invention:

Example I: 24.7 kilos of carbazol-monosulfonic acid, or the corresponding quantity of its sodium salt, are dissolved in about ten times the quantity of concentrated sulfuric acid and mixed, while cooling, with a solution of 12 kilos of para-nitrosophenol in 120 kilos of concentrated sulfuric acid. When the reaction is complete, the blue solution produced is poured onto a mixture of ice, common salt and sodium carbonate, and thus the dark-blue indophenolsulfonic acid, separated in the form of its sodium salt, is freed from the excess of the acid. It has the formula

The free indophenolsulfonic acid and its salts dissolve very readily in water and are decomposed by acids, with heat. The free acid dissolves in water to a blue solution, the salts giving a reddish-violet solution; when dissolved in concentrated sulfuric acid, the color becomes a pure blue. By reducing said indophenol with sodium sulfid, a leuco compound is obtained, which, by the addition of common salt, can be isolated in the form of a gray precipitate. This leuco compound oxidizes quickly in the air and thus becomes again blue; it is readily soluble in water. The free leuco-indophenolsulfonic acid is rather difficultly soluble and can be separated by an acid from the alkali-sulfid solution.

Example II: 26.1 kilos of methylcarbazol-mono-sulfonic acid, or the corresponding quantity of its sodium salt, are dissolved in about ten times the quantity of concentrated sulfuric acid, then mixed, while cooling, with a solution of 12 kilos of nitrosophenol in 120 kilos of concentrated sulfuric acid and, after the reaction is finished, poured upon a mixture of ice, common salt and sodium carbonate. The separated indophenolsulfonic acid shows the same properties as those possessed by the indophenolsulfonic acid of carbazol described in Example I.

If in the foregoing examples p-nitrosophenol is replaced by o-chloro-p-nitrosophenol and the methyl-carbazol-monosulfonic acid by the corresponding ethyl compound, the corresponding chlor-substituted indophenol-ethyl-carbazol-monosulfonic acid is obtained. For instance, 27.5 kilos of ethylcarbazol-monosulfonic acid, or the corresponding quantity of its sodium salt, are dissolved in about ten times the quantity of concentrated sulfuric acid, and this solution is then mixed, while strongly cooling, with a solution of 15.8 kilos of o-chloro-p-nitroso-phenol in 160 kilos of concentrated sulfuric acid. The further operation is conducted as indicated in Example I. The indophenol sulfonic acid thus obtained dissolves in concentrated sulfuric acid to a greenish-blue solution, the solution of the sodium salt in water being of a bluish-violet color. In a similar manner, said indophenolsulfonic acids may be produced by oxidation with p-aminophenol or its halogen compounds, instead of condensing with nitrosophenol, for instance in the following way:

Example III: 27.5 kilos of ethylcarbazolmonosulfonic acid, or the corresponding quantity of its sodium salt, are dissolved in about ten times the quantity of concentrated sulfuric acid, then mixed with a solution of 10.7 kilos of p-aminophenol in 107 kilos of concentrated sulfuric acid; to this mixture are added, while strongly cooling, 21 kilos of powdered manganese dioxid (containing 85 per cent. of $MnO_2$), and the mass is poured onto a mixture of ice and common salt. The separated indophenolsulfonic acid possesses the same properties as that described in Example II. If the p-aminophenol is replaced by 2.6-dichloro-4-aminophenol, the corresponding dichlorindophenol-carbazol-sulfonic acid is obtained, the process for preparing the latter being as follows:

Example IV: 27.5 kilos of ethylcarbazolmonosulfonic acid, or the corresponding quantity of its sodium salt, are dissolved in about ten times the quantity of concentrated sulfuric acid, then mixed with a solution of 17.8 kilos of 2.6-dichloro-4-aminophenol in 180 kilos of concentrated sulfuric acid; to this mixture are added, while strongly cooling, 21 kilos of manganese dioxid (containing 85 per cent. of $MnO_2$), and the mass is poured onto a mixture of ice and common salt, whereupon the indophenolsulfonic acid produced separates. It dissolves in concentrated sulfuric acid with a greenish-blue color, the solution of the sodium salt in water being of a bluish-violet color.

Having now described our invention, what we claim, is:

1. The process of manufacturing indophenolsulfonic acids of the carbazols, which consists in causing the monosulfonic acids of the carbazols to react with phenol derivatives yielding indophenols, substantially as described.

2. As new products, the indophenolsulfonic acids obtainable from the monosulfonic acids of a carbazol and a phenol derivative yielding indophenol, having the formula:

$$C_{12}H_6(NX)(SO_3R).N=Ar=O$$

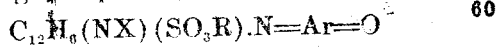

wherein X stands for the series: H, methyl, ethyl, alkyl; R for a cation, and Ar for an arylene residue; being blue bodies, soluble in water and in concentrated sulfuric acid with a blue color, in diluted alkalis and in alcohol with a reddish-violet color.

3. As a new product, the indophenolsulfonic acid obtainable from the monosulfonic acid of carbazol and p-nitrosophenol, having the formula:

$$C_{12}H_6(NH)(SO_3H).N=C_6H_4=O$$

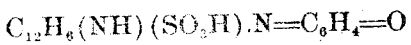

being a blue body, soluble in water and in concentrated sulfuric acid with a blue color, in diluted alkalis and in alcohol with a reddish-violet color.

In testimony whereof, we affix our signatures in presence of two witnesses.

ALBRECHT SCHMIDT.
GUSTAV KRÖNLEIN.

Witnesses:
 JEAN GRUND,
 CARL GRUND.